UNITED STATES PATENT OFFICE.

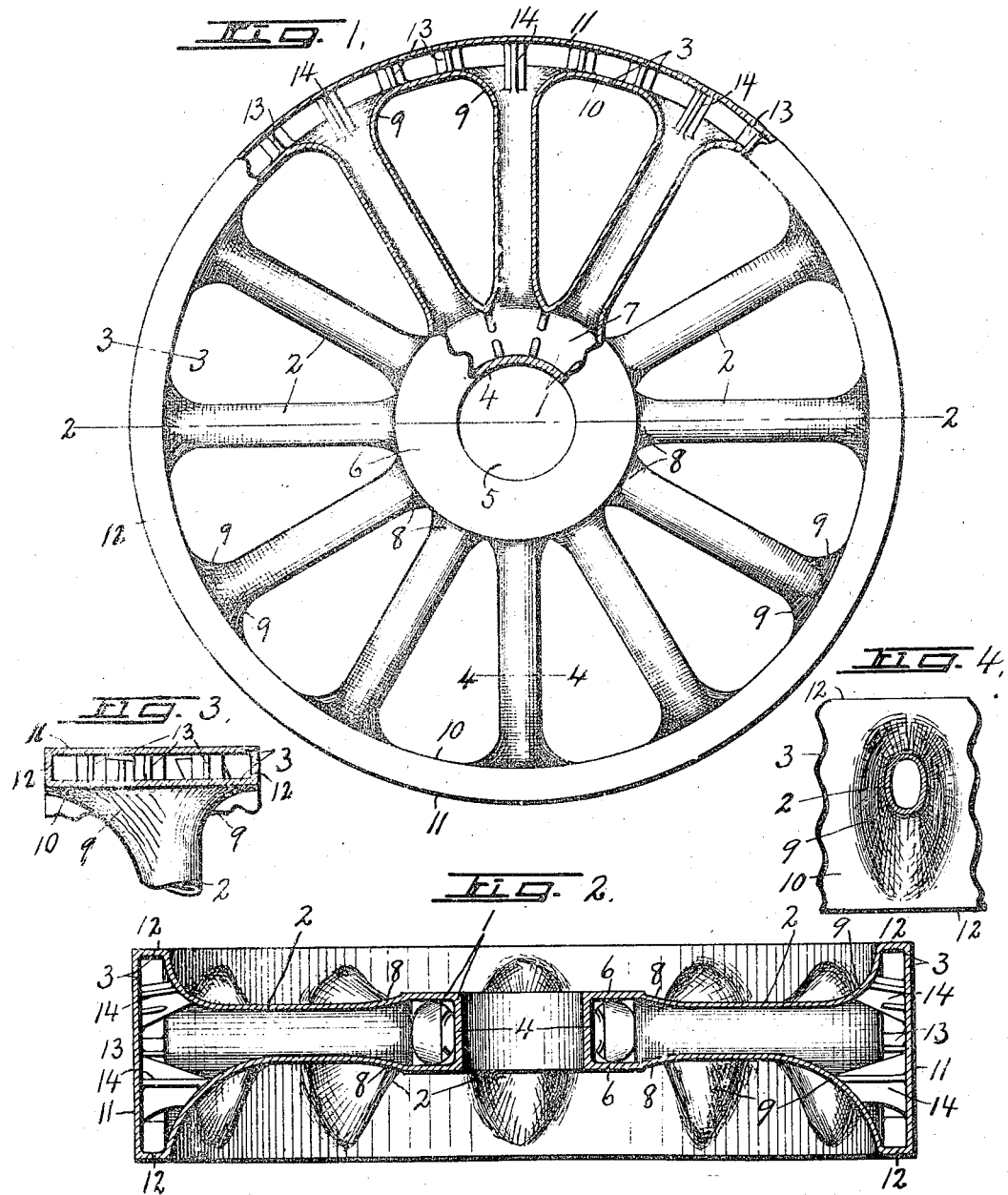

BURNS LYMAN SMITH, OF SYRACUSE, NEW YORK.

SPOKE-WHEEL FOR VEHICLES.

1,178,959.  Specification of Letters Patent.  Patented Apr. 11, 1916.

Application filed June 15, 1915. Serial No. 34,173.

*To all whom it may concern:*

Be it known that I, BURNS L. SMITH, a citizen of the United States of America, and resident of Syracuse, in the county of Onondaga, in the State of New York, have invented new and useful Improvements in Spoke-Wheels for Vehicles, of which the following, taken in connection with the accompanying drawings, is a full, clear, and exact description.

This invention relates to certain improvements in spoke wheels for motor trucks and similar vehicles in which the hub, spokes and rim are subjected to a high degree of more or less irregular compression, warping and tensile strains in passing over obstacles and uneven surfaces in the road-bed. In all road vehicles of this character, the initial, and therefore, the more severe strains are borne directly by the rim and adjacent ends of the spokes by reason of the abrupt and recurrent impact of the rim with obstacles in its line of travel so that if there are any end thrust joints between the rim and spokes, or between the spokes and hub they soon become battered or loosened to such an extent as to render the wheel incapable of performing its function with the necessary degree of safety.

The main object of my present invention is to avoid any possibility of loose connections between the hub and rim, and particularly between the rim and spokes where the strains are most severe. In other words, I have sought to increase the general efficiency and durability of wheels of this character by making the hub, spokes and rim in a single homogeneous hollow unit of cast metal treated in such manner, as by annealing, to reduce its tendency to crystallization.

Another object is to flare the outer and inner ends of the spokes in curved lines at their junctions with the rim and hub, respectively, so as to distribute the rim strains over relatively broad areas which are concentrated toward the center of the spokes, thus affording a certain degree of resiliency under sudden or abrupt impact of the rim with obstacles in its path of travel and correspondingly reducing the end thrust strains upon the spokes and through the spokes to the hub.

A further object is to provide reinforcements between the outer wall of the rim and flaring outer ends of the spokes and also between the inner and outer walls of the rim so as to distribute the load from the tread portion of the rim directly to the spokes and to the inner wall of the rim, thus permitting the wall to be made of comparatively thin stock to reduce its weight without sacrificing its strength or durability.

Other objects and uses relating to specific parts of the wheel will be brought out in the following description.

In the drawings Figure 1 is a side elevation, partly in section, of a vehicle wheel embodying the various features of my invention. Fig. 2 is a central sectional view of the same wheel. Figs. 3 and 4 are detail sectional views taken respectively, on lines 3—3 and 4—4, Fig. 1.

This wheel consists of a hollow cast metal unit comprising a hollow hub —1—, hollow spokes —2— and a hollow rim —3—, all integrally united in one piece without joints or extra connections and constructed in such manner as to present a smooth external appearance closely resembling the standard artillery wheel having wood spokes.

The hub —1— consists of an inner circular wall —4— forming a journal or axle opening —5— and having its ends provided with integral outwardly projecting circular flanges —6— merging with and integrally united to the inner ends of the spokes —2—, said flanges being disposed in parallel planes some distance apart forming an intervening chamber —7—.

The spokes —2— are tubular and preferably elliptical in cross section and extend radially from the periphery of the hub —1— to the inner wall of the rim —3— in equally spaced relation circumferentially and are arranged with their wider portions transversely of the wheel or parallel with its axis, the inner ends of the spokes being flared laterally and circumferentially at —8— to merge with each other and with the periphery of the hub for the purpose of distributing the load to said hub over a greater area than the cross sectional area of any one of the spokes. The outer ends of the spokes are also flared at —9— against the inner wall of the rim so as to cause the load which may be applied to any point of the rim to be distributed over a relatively large area of said rim and concentrated upon the spokes and thence through the spokes to the hub.

By flaring the ends of the spokes against the periphery of the hub and inner wall of the rim in the manner shown and described, and casting all of the parts in one homogeneous unit, I am enabled to reduce to a minimum the tendency of those parts to disintegrate by crystallization and also to avoid any possibility of loose connections between those parts.

The rim —3— consists of inner and outer concentric walls —10— and —11— arranged in spaced relation, except that they are united at their opposite longitudinal edges by circular webs —12—. The inner and outer walls of the rim are substantially flat transversely and are held in spaced relation by integral radial stays —13— between the junctions of the outer ends of the spokes with the inner wall of the rim. These stays —13— are preferably arranged in sets of three each, those of each set being arranged in a substantially straight line transversely of and within the rim at approximately the points where the flaring outer ends of the spokes merge with the inner wall of the rim, as shown more clearly in Figs. 1 and 3, thus providing two sets of stays between adjacent spokes for distributing the load which may be applied to the outer wall of the rim to the spokes through the medium of the inner wall of the rim.

The portions of the outer wall of the rim directly opposite the flaring outer ends of the spokes are connected directly to the adjacent ends of the spokes by reinforcing stays —14— cast integral with the spokes and rim and extending some distance into the flaring outer ends of the spokes, and are, therefore, concealed entirely within the rim and spokes, as shown more clearly in Figs. 1 and 2. These stays —14— are arranged in pairs, one pair for each spoke, having their inner ends integrally united to opposite sides of the outer flaring ends of the spokes, and their outer ends integrally united to the outer walls of the rim, as shown more clearly in Fig. 2, the stays of each pair being arranged in inwardly diverging lines and are relatively broader at their outer ends than at their inner ends so as to transmit the load from as broad an area of the rim as possible directly to the spokes. The inner wall —4— of the hub and also the adjacent edges of the bases of the spokes are braced against the flanges —6— by integral braces —15— which serve to support the portions of the wall —4— and bases of the spokes which extend across the space between the flanges —6—, thereby adding materially to the strength and durability of the hub and load-sustaining power of the spokes. As a further means for preventing crystallization of any of the parts of the wheel, the latter is carefully annealed or malleableized to such an extent as to render the cast metal less susceptible to disintegration under vibration.

What I claim is:

1. A one-piece cast wheel having a hollow rim and hollow spokes with internal braces uniting the outer ends of the spokes to the outer wall of the rim.

2. A one-piece metal spoke-wheel having its hub, spokes and rim hollow and the outer ends of its spokes flared against the inner wall of the rim, and reinforcing webs connecting the flaring outer ends of the spokes with the outer wall of the rim and concealed within said rim and spokes.

3. A one-piece cast wheel having a hollow rim of substantially rectangular cross section and hollow spokes gradually widening at their outer ends to approximately the width of the rim, with internal webs joining the outer wall of the rim to opposite sides of the adjacent portions of the spokes.

4. A one-piece cast wheel having a relatively narrow hollow hub and a considerably wider hollow rim of substantially rectangular cross section with hollow spokes having their inner ends of approximately the width of the hub and their outer ends gradually increasing in width to substantially the width of the rim, with internal brace members extending out from the outer wall of the rim some distance into the outer ends of the spokes and joining said spokes to the outer wall of the rim.

In witness whereof I have hereunto set my hand this 4th day of June, 1915.

BURNS LYMAN SMITH.

Witnesses:
H. E. CHASE,
ALICE M. CANNON.